(12) United States Patent
Nishimura et al.

(10) Patent No.: US 7,870,806 B2
(45) Date of Patent: Jan. 18, 2011

(54) BALL SCREW DEVICE

(75) Inventors: Kentarou Nishimura, Tokyo (JP); Akimasa Yoshida, Tokyo (JP); Hiroshi Niwa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/003,590

(22) Filed: Dec. 28, 2007

(65) Prior Publication Data

US 2008/0110286 A1    May 15, 2008

Related U.S. Application Data

(63) Continuation of application No. 10/485,881, filed as application No. PCT/JP02/08917 on Sep. 3, 2002, now Pat. No. 7,350,434.

(30) Foreign Application Priority Data

Sep. 4, 2001   (JP) ............................. 2001-266899
Sep. 26, 2001  (JP) ............................. 2001-294577

(51) Int. Cl.
    *F16H 25/20*   (2006.01)
(52) U.S. Cl. ............... 74/424.82; 74/424.86; 74/424.87
(58) Field of Classification Search ............... 74/424.82, 74/424.86, 424.87
    See application file for complete search history.

(56) References Cited

U.S. PATENT DOCUMENTS

| | | |
|---|---|---|
| 4,148,226 A | 4/1979 | Benton |
| 4,795,172 A | 1/1989 | Brande |
| 5,492,036 A | 2/1996 | Sato |
| 5,988,007 A | 11/1999 | Nishimura |
| 6,176,149 B1 | 1/2001 | Misu |
| 6,561,053 B2 | 5/2003 | Greubel |

FOREIGN PATENT DOCUMENTS

| | | |
|---|---|---|
| JP | 05-003715 U1 | 1/1993 |
| JP | 06-201013 A1 | 7/1994 |
| JP | 11-051145 A1 | 2/1999 |
| JP | 2000-337470 A1 | 12/2000 |
| JP | 2001-122138 A1 | 5/2001 |
| WO | WO-97/48922 A1 | 12/1997 |

OTHER PUBLICATIONS

International Search Report for PCT/JP02/08917 mailed on Dec. 10, 2002.

*Primary Examiner*—William C Joyce
(74) *Attorney, Agent, or Firm*—Rader, Fishman & Grauer PLLC

(57) ABSTRACT

The invention relates to a ball screw device in which a screw shaft and a nut member are threadedly engaged with each other through a number of balls. In such a ball screw device, an inner surface of a cover plate contacting an end surface of a nut main body is provided with a projecting return piece adapted to be fit-engaged with a recess cut in an inner peripheral surface of the nut main body, the return piece being provided with a scoop portion for dislodging the balls from the ball rolling groove of the screw shaft and a direction switching passage for guiding the dislodged balls to the entrance of a ball return hole. The projecting return piece is divided into a first piece formed integral with the cover plate and a second piece fixed to the first piece by a curved plane including the center line of the direction switching passage.

6 Claims, 14 Drawing Sheets

BALL SCREW DEVICE

The present application is a continuation of patent application Ser. No. 10/485,881 filed Feb. 5, 2005, which is a 371 of PCT/JP02/08971 filed Sep. 3, 2002, the entire contents of which are incorporated herein by reference.

TECHNICAL FIELD

The present invention relates to a ball screw device in which a screw shaft and a nut member are threadedly engaged with each other through the intermediation of a number of balls and, more particularly to an improved ball screw device in which the nut member is equipped with a so-called end cap type ball circulation structure.

BACKGROUND ART

Conventionally, a ball screw device in which a screw shaft and a nut member are threadedly engaged with each other through the intermediation of a number of balls is well known. In such a ball screw device, a spiral ball rolling groove formed in an outer peripheral surface of the screw shaft and a spiral load rolling groove formed in an inner peripheral surface of the nut member face each other to form a load passage, with balls effecting load application between the screw shaft and the nut member while rolling in this load passage. Further, the nut member is equipped with a non-load passage for circulating balls having rolled through the load passage back to the load passage. As the screw shaft and the nut member make relative rotation, the balls endlessly circulate from the load passage to the non-load passage, and from the non-load passage to the load passage.

Ball screw devices can be classified into several types according to the structure of the non-load passage, including a so-called end cap type ball screw device. Examples of the end cap type ball screw device are disclosed in JP o6-201013A and WO97/48922, the former of which is shown in FIG. 16. In this ball screw device, a nut member 100 is composed of a nut main body 102 in which a load rolling groove 101 as mentioned above is formed and a pair of end caps 103 attached to the axial end surfaces of the nut main body 102. More specifically, a ball return hole 104 parallel to the axial direction is formed in the nut main body 102, and the end caps 103 attached to the end surfaces of the nut main body 102 have scoop portions 108 for dislodging balls 107 from a ball rolling groove 106 of a screw shaft 105 and direction switching passages 109 for guiding the dislodged balls 107 to an entrance of the ball return hole 104. By fixing the end caps 103 to the nut main body 102, the ball return hole 104 and the direction switching passages 109 are communicatingly connected together to complete a non-load passage for the balls 107. In addition, the non-load passage of this end cap type device circulates the balls from one to the other end of the nut main body, so that the device has adaptability to an increase in the total length of the nut main body, which is advantageous when the lead of the ball rolling groove formed in the screw shaft is fast. Thus, this end cap type ball screw device is most suitable for linearly guiding a movable body, such as a table, at high speed.

However, as described above, in the conventional end cap type ball screw device, the end caps have scoop portions for dislodging the balls from the ball rolling groove of the screw shaft and direction switching passages for guiding the dislodged balls to the ball return hole, so that the thickness of the end caps must be rather large. Thus, when the end caps are fixed to the end surfaces of the nut main body, the total length of the nut member is rather large for the magnitude of the load applied, thus making it impossible to achieve a reduction in the size of the nut member.

To reduce the thickness of the end caps, it is expedient if the direction switching passages 109 in the end cap 103 extend in a direction perpendicular to the axial direction of the screw shaft 105 as in the case of the conventional ball screw device shown in FIG. 16. However, the ball rolling groove 106 of the screw shaft 105 is formed spirally, and the balls 107 rolling in this ball rolling groove 106 also have a speed component in the axial direction of the screw shaft 105. Thus, when the direction switching passages 109 extend in the above-mentioned direction, the advancing direction of the balls 107 dislodged from the ball rolling groove 106 is changed forcibly, with the result that the balls 107 repeatedly collide with the end caps 103. Thus, when the balls 107 are circulated at high speed, there is a fear of the end caps 103 being damaged. Further, a great resistance is offered to the circulation of the balls 107, which leads to a limitation in the high speed feeding of the movable body. Further, the balls 107 and the end caps 103 generate collision sound, which leads to a problem of noise during use.

DISCLOSURE OF THE INVENTION

The present invention has been made in view of the above problems in the prior art. It is an object of the present invention to provide a ball screw device which allows minimizing the total length of the nut member and which can guide the balls dislodged from the ball rolling groove smoothly to the ball return hole, thus generating minimum noise even when the balls are circulated at high speed and proving itself most suitable for the feeding of a movable body, such as a table.

To achieve the above object, in the ball screw device of the present invention, a recess is formed in the inner peripheral surface of the nut main body, and a return piece is fit-engaged with this recess, the return piece being accommodated in the recess without protruding from the axial end surface of the nut main body. The recess is formed so as to be open in the axial end surface of the nut main body and at a position corresponding to each of the end portions of the spiral load rolling groove formed in the inner peripheral surface of the nut main body. Further, the return piece is equipped with a scoop portion for dislodging the balls from the ball rolling groove of the screw shaft and a direction switching passage for guiding the dislodged balls to the entrance of the ball return hole. By fit-engaging the return piece with the recess, the balls having rolled through the load rolling groove of the nut main body roll into the direction switching passage by way of the scoop portion. Further, mounted to the nut main body is a pipe member forming a ball return hole substantially parallel to the screw shaft. When the return piece is fit-engaged with the recess of the nut main body, the ball return hole of the pipe member and the direction switching passage of the return piece are connected with each other, forming an endless circulation route for the balls. Further, substantially donut-shaped cover plates are fixed to the axial end surfaces of the nut main body, with the cover plates covering the return piece fit-engaged with the recess of the nut main body.

Thus, in the ball screw device of the present invention, the endless circulation route for the balls is formed solely by fit-engaging the return piece with the recess of the nut main body. Further, the return piece is accommodated in the recess of the nut main body and does not axially stick out from the nut main body, so that the total axial length of the nut member threadedly engaged with the screw shaft through the balls is the same as that of the nut main body, thus making it possible to minimize the total length of the nut member.

In particular, for the balls dislodged from the ball rolling groove of the screw shaft to roll into the direction switching passage, it is important that the screw shaft side entrance region of the direction switching passage be contiguous with the load rolling groove of the nut main body. For that purpose, it is desirable for the direction switching passage to be formed so as to be matched with the direction of an extension of the ball rolling groove of the screw shaft in the tangential direction of the screw shaft. That is, the screw shaft side entrance region of the direction switching passage is formed so as to be inclined by the lead angle of the ball rolling groove with respect to a plane perpendicular to the axial direction of the ball shaft. Even in the case in which the direction switching passage is thus formed so as to be inclined with respect to a plane perpendicular to the axial direction of the screw shaft, the return piece in which the direction switching passage is formed is accommodated in the nut main body, so that the cover plate may simply be in the form of a plate, and there is no fear of an increase in the total length of the nut member completed by mounting the cover plate.

The return piece may be formed of metal or synthetic resin. While a metal return piece is superior from the viewpoint of strength with respect to use over a period of time, a return piece of synthetic resin is superior from the viewpoint of reducing the noise generated when the balls roll.

Further, since the return piece is equipped with a scoop portion and a direction switching passage, the return piece has a complicated configuration, and from the viewpoint of producing it easily, it is desirable to adopt a construction in which the return piece is divided into a first piece and a second piece by a curved plane including a center line of the direction switching passage, the return piece consisting of a combination of these pieces.

Further, while the return piece may be singly fit-engaged with the recess of the nut main body, it is also possible to form the return piece integrally with the cover plate, fit-engaging the return piece protruding from the cover plate with the recess of the nut main body when the cover plate is mounted on the end surface of the nut main body.

On the other hand, in the screw shaft side entrance of the direction switching passage, there is provided a scoop portion for dislodging balls from the ball rolling groove of the shaft screw. From the viewpoint of guiding the balls smoothly to the direction switching passage without allowing them to collide with the scoop portion, it is desirable for the scoop portion to protrude slightly on the shaft screw side with respect to the inner peripheral surface of the nut main body and for the direction switching passage to be formed in an arcuate configuration in conformity with the inner peripheral surface of the nut. By forming the scoop portion in such a configuration, the balls rolling in the ball rolling groove of the screw shaft are held on either side as they are dislodged from the ball rolling groove, and roll as they are into the direction switching passage, so that there is no fear of the balls colliding with the scoop portion, and even when the balls are circulated through the endless circulation path at high speed, no excessive force is applied to the return piece. Further, it is also possible to minimize noise generation.

In dividing the return piece into the first piece and the second piece by a curved plane including the center line of the direction switching passage, the scoop portion may be divided between the first piece and the second piece or may be formed only in either the first piece or the second piece. In the former case, the direction switching passage is completely divided into the first piece and the second piece, including the scoop portion, so that the configuration of the first piece and the second piece is simplified, thus facilitating its production. In contrast, in the latter case, in which the scoop portion is formed in either the first piece or the second piece, it is impossible to completely divide the direction switching passage into the first piece and the second piece, and the configuration of the first piece and the second piece is somewhat complicated. On the other hand, it is advantageously possible to shape the scoop portion with high accuracy.

Further, from the viewpoint of preventing the balls from colliding with each other in the endless circulation route to smoothen the circulation of the balls and to prevent noise generation as much as possible, it is desirable to provide spacers of synthetic resin between the balls adjacent to each other. Considering that such spacers are to be provided between the balls, it is not desirable for the rolling direction of the balls in the endless circulation route to change abruptly. When there is such a change, there is a fear of the spacers being dislodged from between the balls. Thus, from this viewpoint, it is desirable for the screw shaft side entrance region of the direction switching passage to be matched with the direction of an extension of the load rolling groove in the tangential direction of the inner peripheral surface of the nut main body. Further, it is desirable for the scoop portion to be formed by cutting out the direction switching passage in an arcuate configuration in conformity with the inner peripheral surface of the nut.

Furthermore, according to the present invention, a synthetic resin pipe body is mounted to the nut main body to form a ball return hole, and when the return piece in which the direction switching passage is formed of synthetic resin, the non-load passage for endless circulation of the balls is entirely covered with synthetic resin, so that it a is possible to minimize noise generation during the circulation of the balls as much as possible.

DESCRIPTION OF REFERENCE NUMERALS

1 . . . screw shaft, 2 . . . ball, 3 . . . nut member, 4 . . . nut main body, 5 . . . cover plate, 6 . . . pipe member, 9 . . . second piece, 10 . . . ball rolling groove, 20 . . . spacer, 42 . . . load rolling groove, 47 . . . recess, 53 . . . return piece, 54 . . . first piece, 55 . . . scoop portion, 56 . . . direction switching passage, 60 . . . ball return hole

BEST MODE FOR CARRYING OUT THE INVENTION

A ball screw device of the present invention will now be described in detail with reference to the accompanying drawings.

Figure 1:
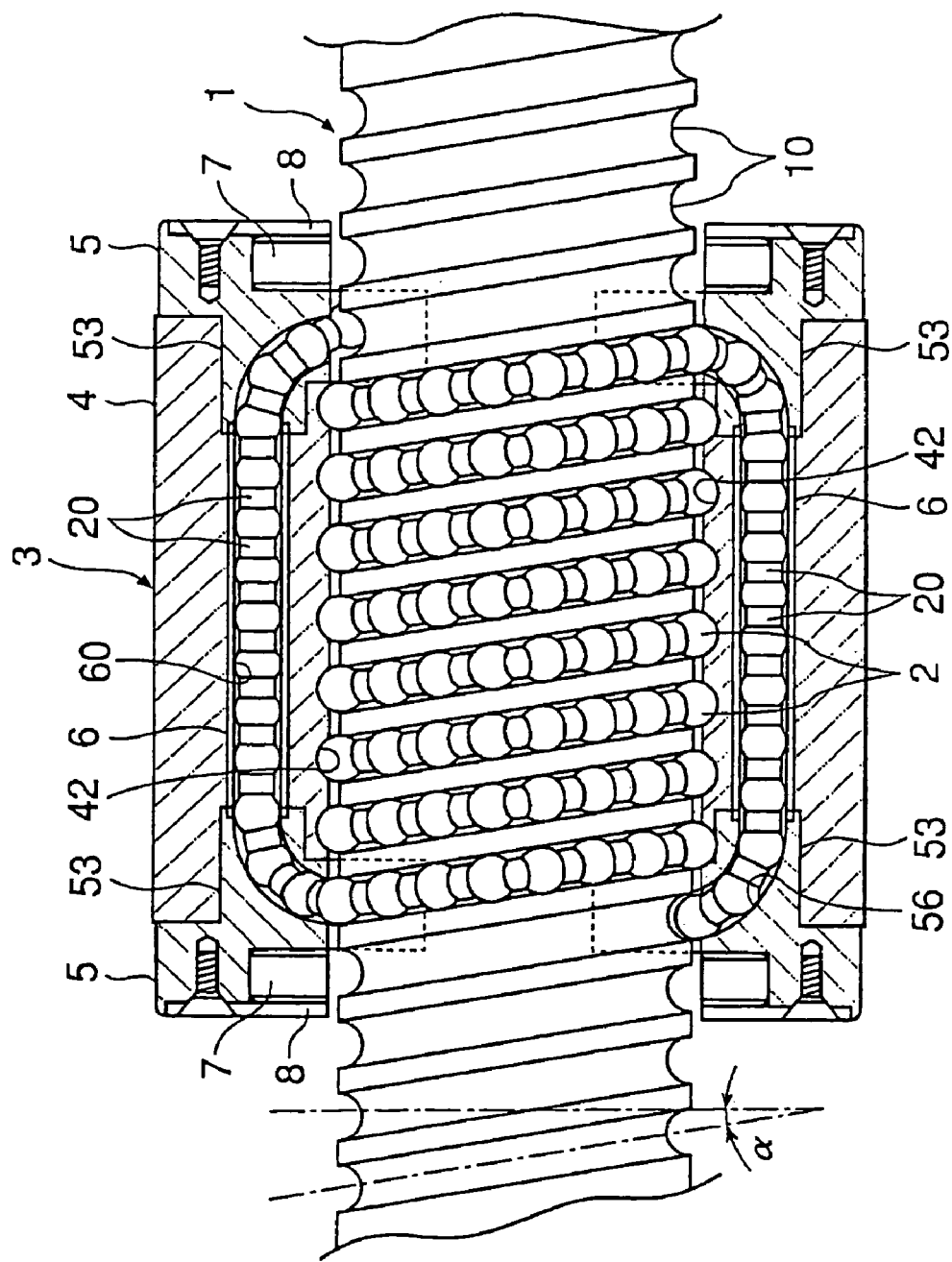
FIG. 1 is a side sectional view of a ball screw device according to a first embodiment of the present invention.
Figure 2:
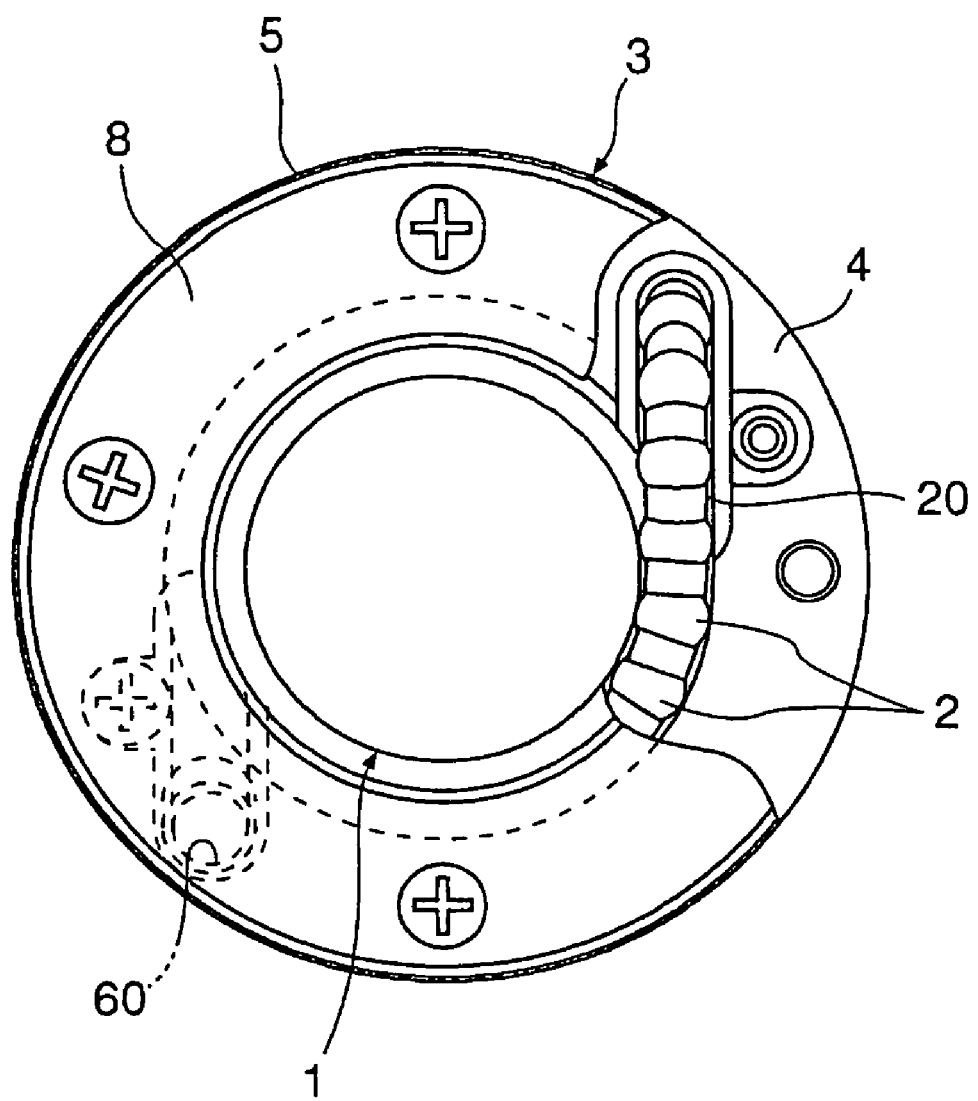
FIG. 2 is a front view (partially cutaway sectional view) of the ball screw of the first embodiment.

FIGS. 1 and 2 show a ball screw device according to a first embodiment of the present invention. This ball screw device is composed of a screw shaft 1 whose outer peripheral surface has a spiral ball rolling groove 10 formed at a predetermined lead, and a nut member 3 threadedly engaged with the screw shaft 1 through the intermediation of a number of balls 2 and equipped with an endless circulation route for the balls 2, wherein the nut member 3 makes a movement in the axial direction of the screw shaft 1 through relative rotation of the screw shaft 1 and the nut member 3. Further, the screw shaft 1 has two streaks of ball rolling grooves 10, and the nut member 3 also has two endless circulation routes of the balls 2.

In this ball screw device, spacers 20 are provided between the balls 2 adjacent to each other in the endless circulation routes, thus preventing the balls 2 from coming into direct contact with each other. The spacers 20 are disc-like members formed of synthetic resin, each having on either side of the disk-like member a spherical seat on which the spherical surface of each ball 2 is to be seated.

Figure 3:
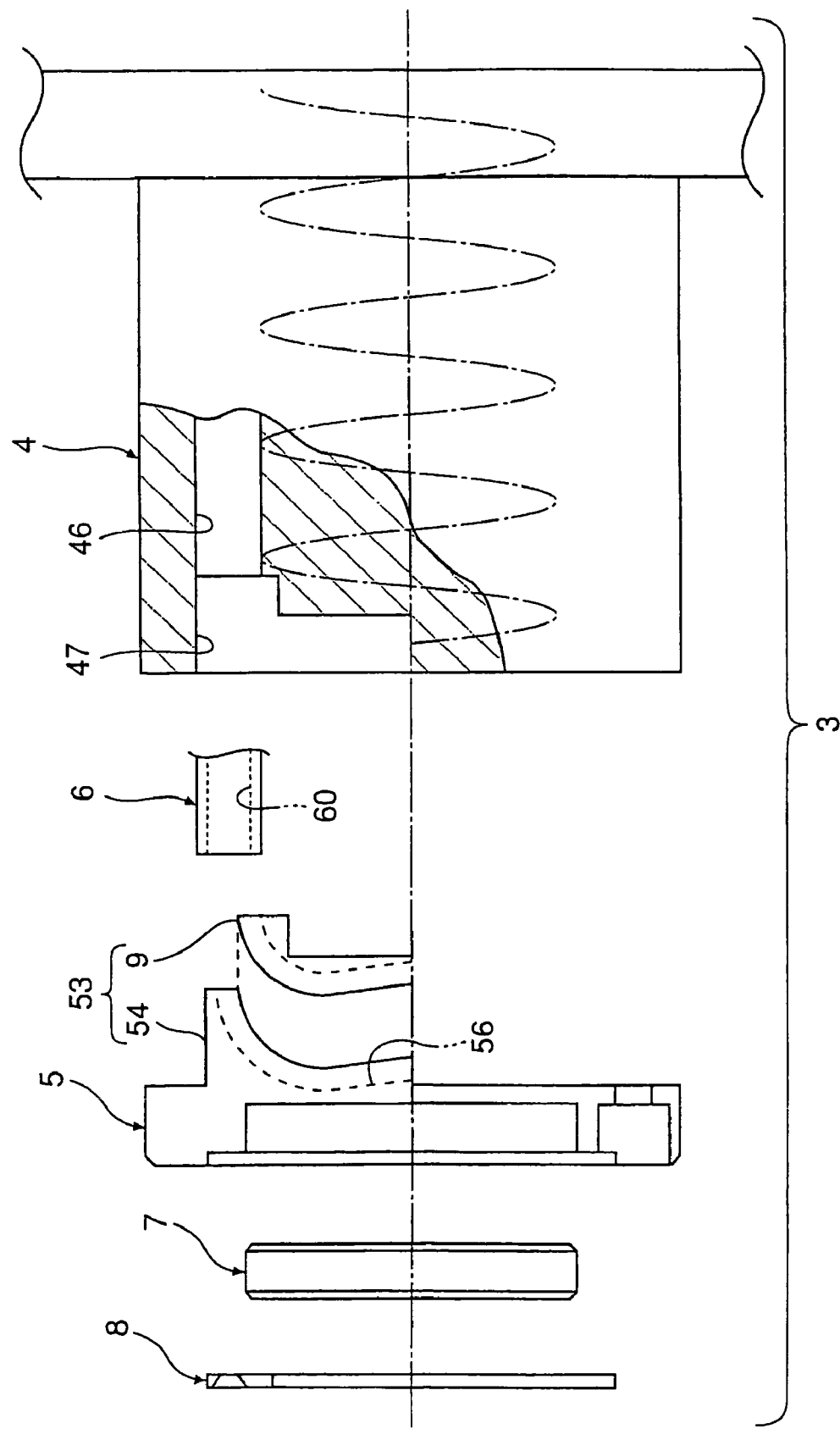
FIG. 3 is an exploded view of a nut member according to the first embodiment.

FIG. 3 is an exploded view of the nut member 3. As shown in the drawing, the nut member 3 is composed of a nut main body 4 formed of steel, return pieces 53 fit-engaged with the nut main body, a pair of cover plates 5 of synthetic resin fixed to the front and rear end surfaces of the nut main body 4, and a pair of pipe members 6 sandwiched between the cover plates 5 and fixed to the nut main body 4, wherein endless circulation routes for the balls 2 are formed by fixing the return pieces 53, the cover plates 5, and the pipe members 6 to the nut main body 4. Further, attached to the cover plates 5 are labyrinth seals 7 for preventing dust from entering the interior of the nut member 3, with the labyrinth seals being fixed to the cover plates 5 by a seal presser plates 8 fixed to the cover plates 5 by means of screws. FIG. 3 only shows the cover plate 5 mounted to one side of the nut main body 4.

Figure 4:
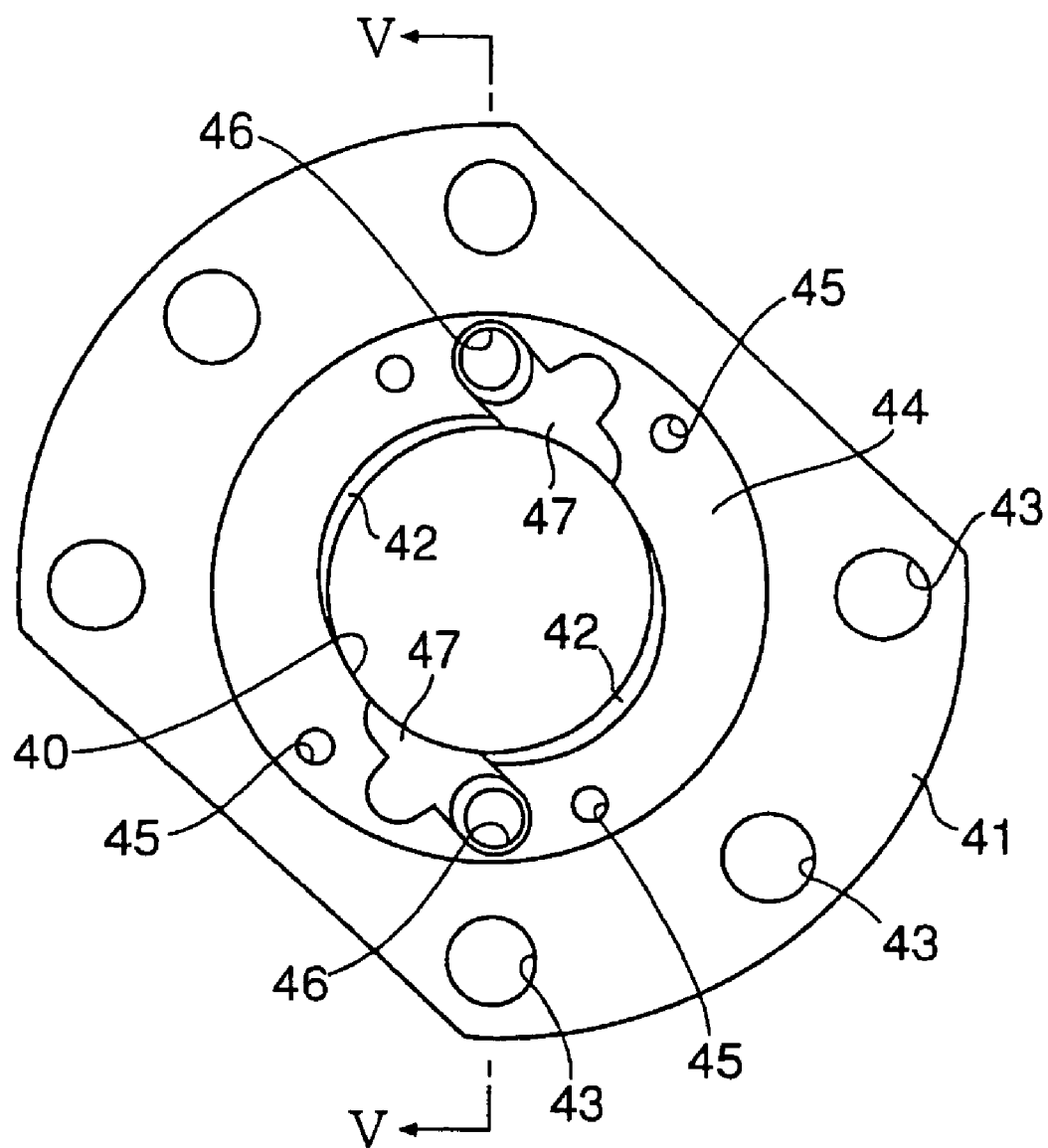
FIG. 4 is a front view of a nut main body according to the first embodiment.
Figure 5:
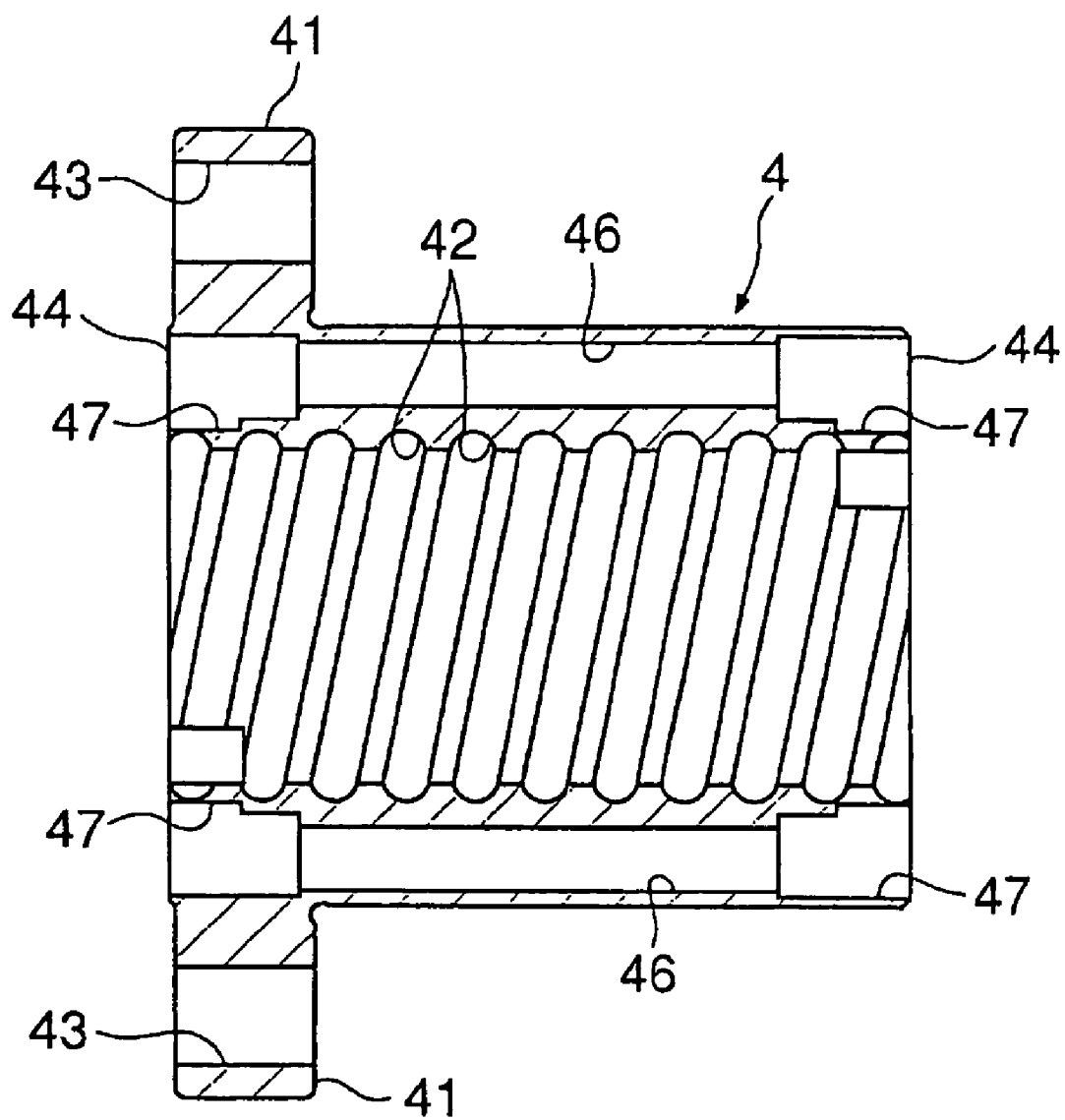
FIG. 5 is a sectional view taken along the line V-V of FIG. 4.

FIGS. 4 and 5 show the nut main body 4. This nut main body 4 is formed as a cylinder having at its center a through-hole 40 for the screw shaft 1, and a flange portion 41 for fixing the nut main body 4 to a movable body such as a table protrudes from the outer peripheral surface thereof. Further, in the inner peripheral surface of the through-hole 40, there are formed spiral load rolling grooves 42 facing the ball rolling grooves 10 of the screw shaft 1, with the balls 2 rolling between the ball rolling grooves 10 and the load rolling grooves 42 while applying load. The flange portion 41 has through-holes 43 serving as bolt holes for fixing the nut main body 4 to the movable body.

The axial end surfaces of the nut main body 4 constitute mounting surfaces 44 of the cover plates 5, and tap holes 45 are formed in the mounting surfaces 44 for threaded engagement of mounting screws for the cover plates 5. Between these mounting surfaces 44, there are formed pipe mounting holes 46 so as to axially extend through the nut main body 4, and the above-mentioned pipe members 6 are fit-engaged with the pipe mounting holes 46. The pipe members 6 are formed as cylinders with ball return holes 60, and the balls 2 under no load released from the load roll into through the ball return holes 60 in the axial direction of the nut main body 4. Further, in order to prevent, as much as possible, noise generation due to the contact between the balls 2 rolling at high speed through the ball return holes 60 and the pipe members 6, the pipe members 6 are formed of synthetic resin.

In conformity with the two streaks of ball rolling grooves 10 formed in the screw shaft 1, two pipe mounting holes 46 are provided so as to be spaced apart from by 180 degrees and opposed to each other with the through-hole 40 therebetween. Recesses 47 for accommodating the return pieces 53 are formed at the ends of the pipe mounting holes 46 open in the mounting surfaces 44 for the cover plates 5. As shown in FIG. 4, these recesses 47 are cut out so as to extend tangentially from the through-hole 40 of the nut main body 4, connecting the through-hole 40 to the pipe mounting holes 46. The ends of the two streaks of load rolling grooves 42 formed in the inner peripheral surface of the nut main body 4 are divided by the recesses 47 immediately before they reach the cover plate mounting surfaces 44.

Figure 6:
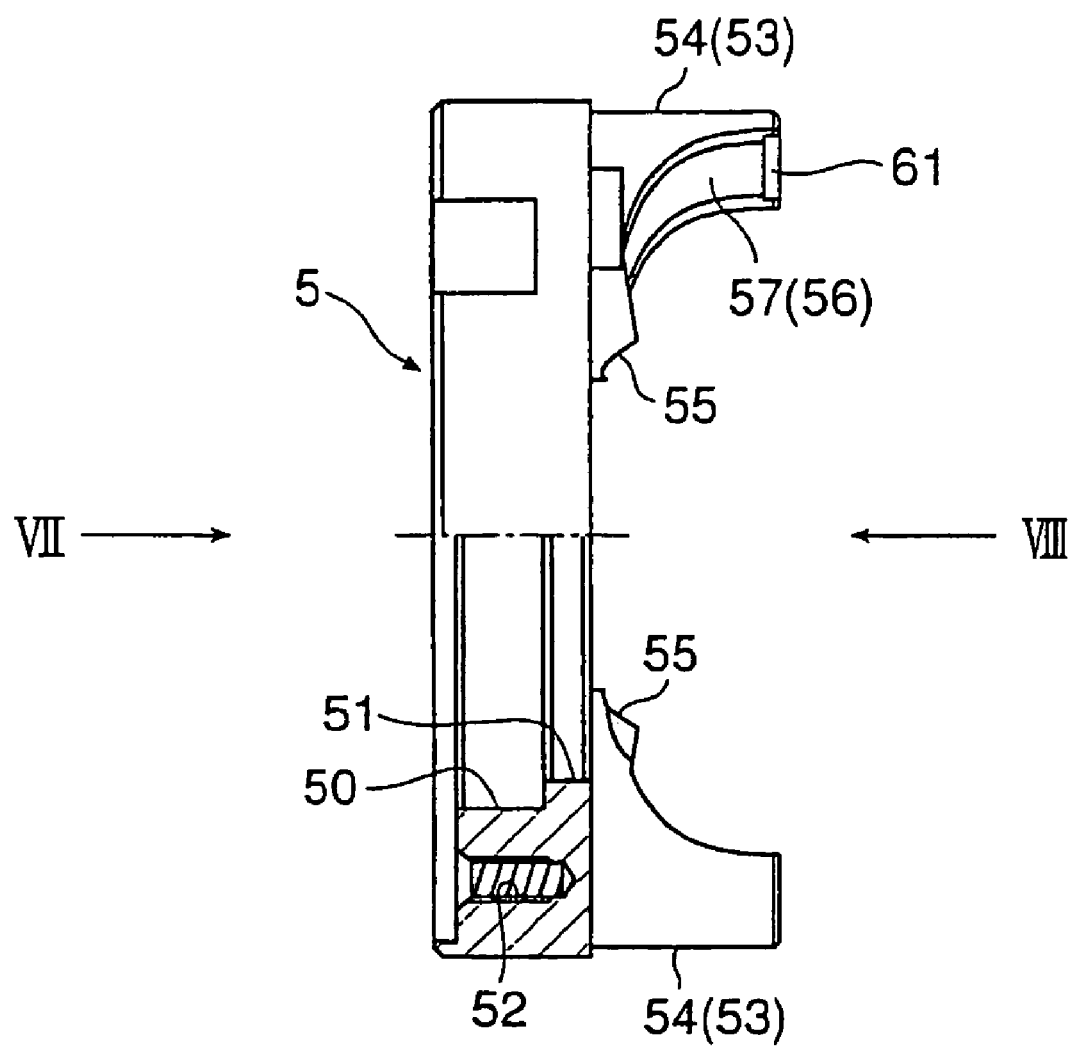
FIG. 6 is a side view of a cover plate according to the first embodiment.
Figure 7:
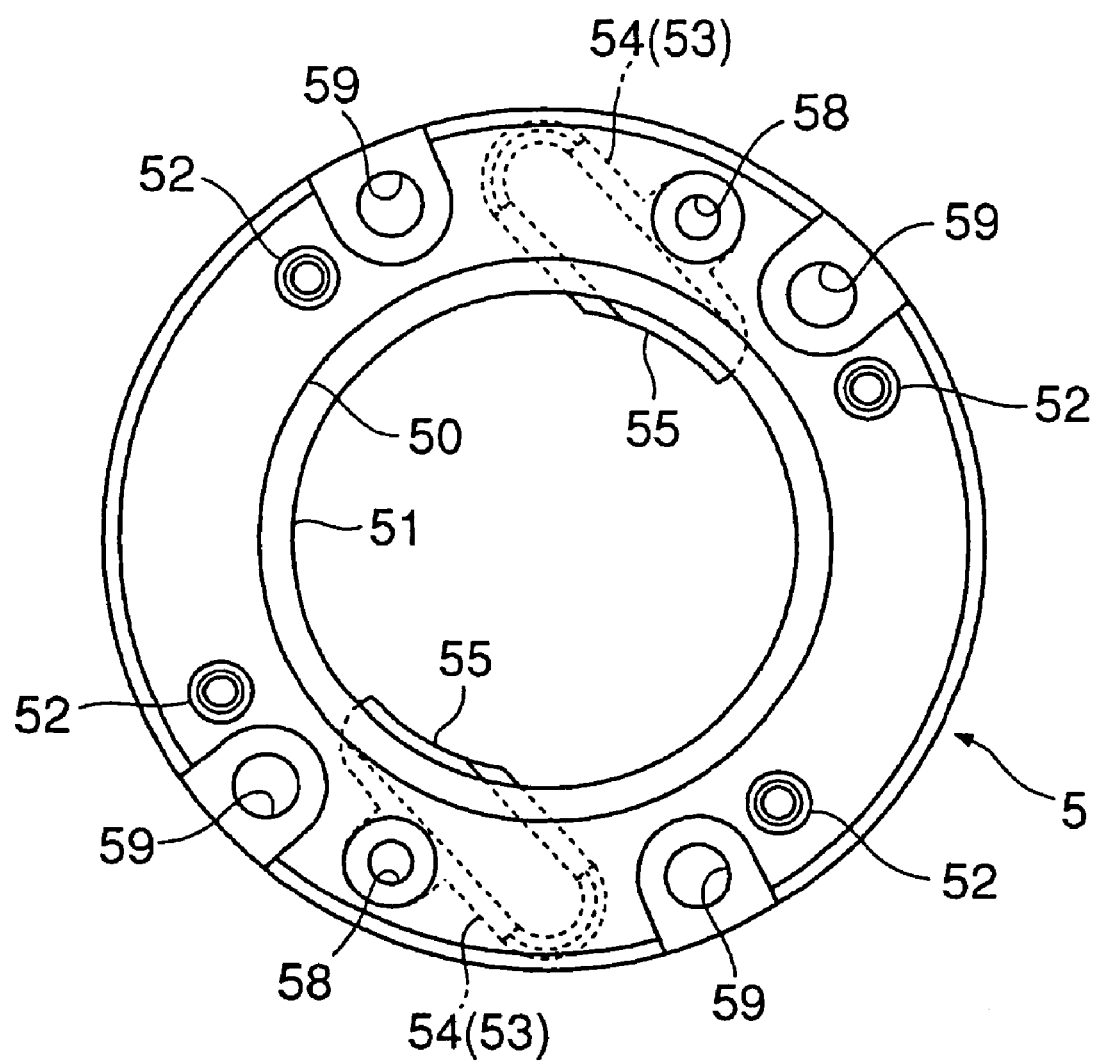
FIG. 7 is a view seen from a direction of the arrow VII of FIG. 6.
Figure 8:
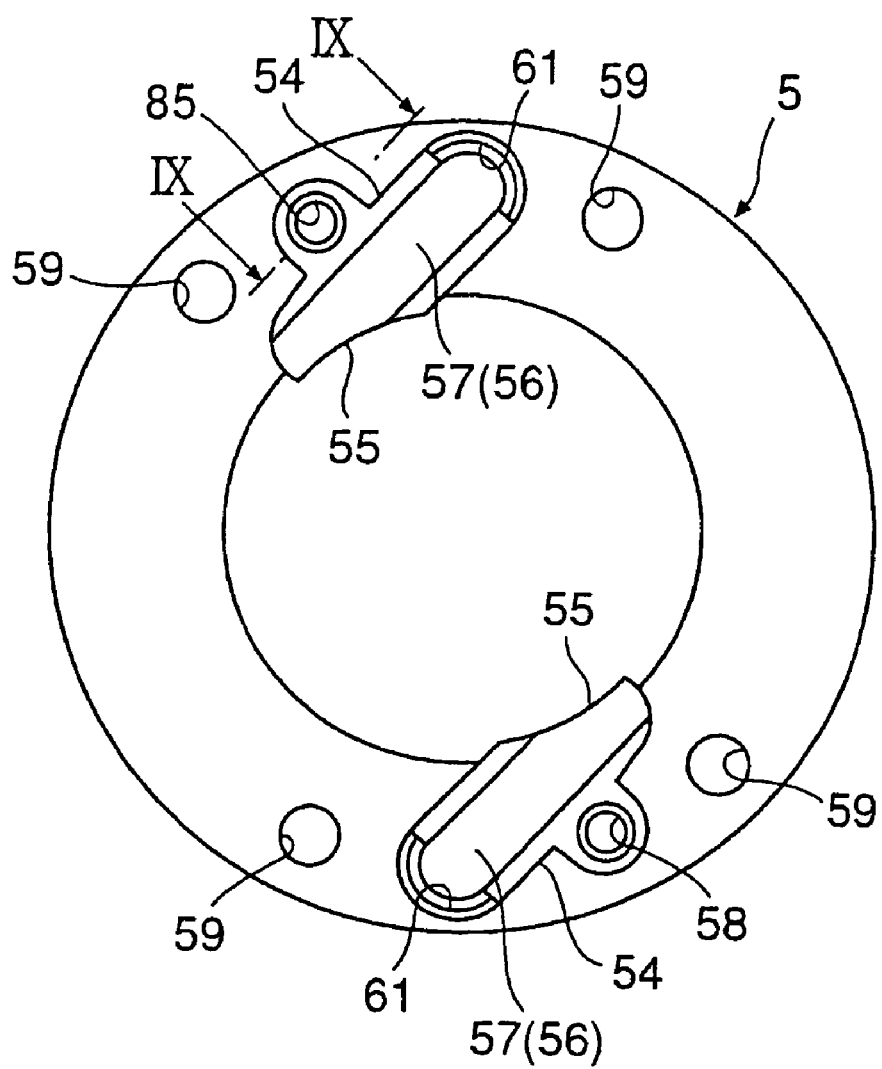
FIG. 8 is a view seen from a direction of the arrow VIII of FIG. 6.
Figure 9:
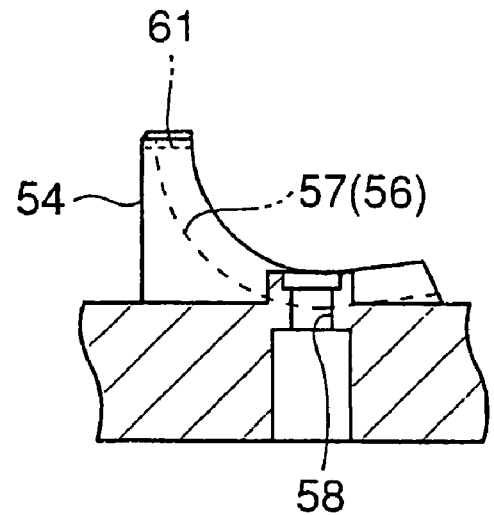
FIG. 9 is a sectional view taken along the line IX-IX of FIG. 8.

FIGS. 6 through 8 show the cover plate 5. The cover plate 5 is formed as a substantially donut-shaped member covering the mounting surface 44 on the nut main body side; it is prepared by injection molding of synthetic resin. On the outer side of the cover plate 5, there is formed an annular groove 50 for mounting the labyrinth seal 7 around the through-hole 51, and there are formed screw holes 52 for fixing the seal presser plate 8 on the outer side of the annular groove 50. Further, mounting holes 59, through which the mounting screws for mounting the cover plate 5 to the nut main body 4 are to be passed, extend through the cover plate 5.

Figure 10:
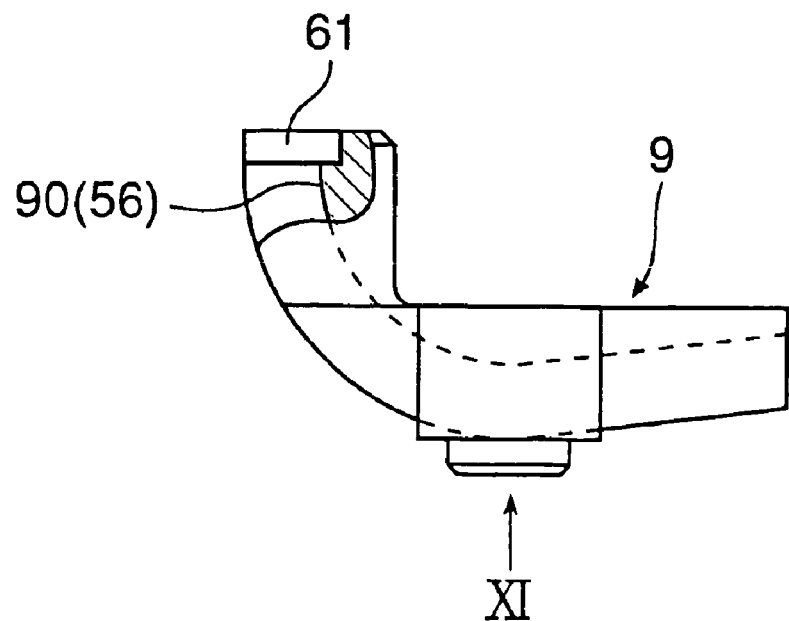
FIG. 10 is a side view (partially cutaway sectional view) of a return piece according to the first embodiment.
Figure 11:
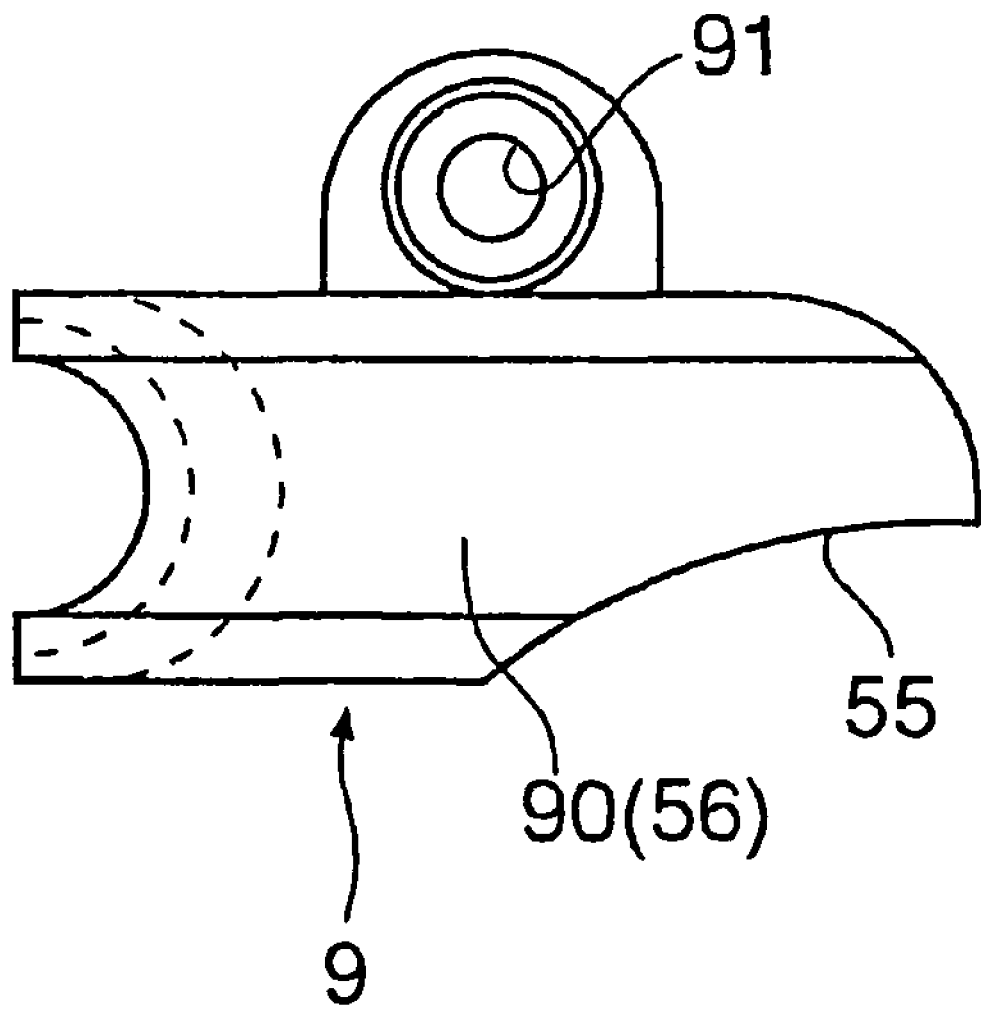
FIG. 11 is a bottom view of the return piece of the first embodiment.

Further, on the inner side of the cover plate 5, there protrude the return pieces 53 to be fit-engaged with the recess of the nut main body. The return pieces are composed of first pieces 54 formed so as to protrude from the inner side of the cover plate 5 and second pieces 9 (See FIGS. 10 and 11) fixed to the first pieces 54 by screws. As shown in FIG. 3, by combining the first pieces 54 with the second pieces 9, the return pieces 53 are equipped with scoop portions 55 for dislodging the balls 2 from the ball rolling grooves 10 of the screw shaft 1 and direction switching passages 56 for feeding the dislodged balls 2 into the ball return holes 60 of the pipe members 6. The second pieces 9 are equipped with flanges 92 for accommodating hexagonal nuts (not shown). Bolts inserted from the cover plate 5 side are threadedly engaged with the hexagonal nuts, whereby the second pieces 9 are fixed to the cover plate 5. Through-holes 58 through which the bolts are to be passed are formed adjacent to the first pieces 54, and through-holes 91 through which the bolts are to be passed are formed adjacent to the second pieces 9.

Inside these return pieces 53, the direction switching passages 56 are curved so as to vary the rolling direction of the balls 2 by 90 degrees or more, and one end of each of the direction switching passages 56 is open on a side surface of the return piece 53 raised from the cover plate 5, the other end thereof being open at the forward end surface of the return piece 53 protruding from the cover plate 5. The former opening is the screw shaft 1 side entrance, and the latter opening is the ball return hole 60 side entrance formed in the pipe member 6. An annular groove 61 is formed at the ball return hole 60 side edge portion of each direction switching passage 56. When the cover plate 5 is attached to the nut main body 4, the forward end portions of the pipe members 6 are fit-engaged with the annular grooves 61. Due to this arrangement, the direction switching passages 56 provided in the cover plate 5 and the ball return holes 60 formed in the pipe members 6 are connected together with high accuracy, making it possible to smoothen the rolling of the balls 2 between these passages.

Each of the return pieces 53 is divided by a curved plane including the center line of the direction switching passage 56 into the first piece 54 and the second piece 9. Thus, the first piece 54 and the second piece 9 respectively have grooves 57 and 90 with a semi-circular section and opposed to each other, and these grooves 57 and 90 are combined with each other to form the direction switching passage 56. Further, formed at the screw shaft 1 side entrance of each direction switching passage 56 is a scoop portion 55 for dislodging the balls 2 from the ball rolling groove 10 of the screw shaft 1, and this scoop portion 55 is also divided into the first piece 54 and the second piece 9. This scoop portion 55 protrudes toward the screw shaft 1 side slightly beyond the inner peripheral surface of the nut main body 4, and is arranged in correspondence with the gap between the inner peripheral surface of the nut main body 4 and the outer peripheral surface of the screw shaft 1. Further, the scoop portion 55 is formed by cutting the direction switching passage 56 in an arcuate configuration in conformity with the inner peripheral surface of the nut main body 4. Thus, this scoop portion 55 is substantially the same configuration as obtained by obliquely cutting one end portion of a pipe. As the balls 2 advances inwards from the inlet of the direction switching passage 56, the scoop portion 55 covers the balls 2 gradually from either side with respect to the advancing direction, eventually accommodating the balls in the direction switching passage.

The nut member 3 formed by the above components is assembled by the following procedures. First, the pipe members 6 are inserted into the pipe mounting holes 46 of the nut main body 4, and then the pair of cover plate 5 with the second pieces mounted thereto are fixed to the mounting surfaces 44 of the nut main body 4 by screws. When the second pieces 9 are secured to the first pieces 54 formed integrally with the cover plates 5, there are formed the return pieces 53 equipped with the direction switching passages 56 and the scoop portions 55 in the cover plates 5, and by fit-engaging these return pieces 53 with the recesses 47 formed in the nut main body 4, it is possible to accurately perform positioning on the cover plates 5 with respect to the nut main body 4. Further, when the cover plates 5 are attached to the nut main body 4, the pipe members 6 previously inserted into the nut main body 4 are held from both ends by the protrusions 53 of the cover plates 5, and the end portions of the pipe members 6 are fit-engaged with the annular grooves 61 formed at the forward ends of the protrusions 53, whereby an endless circulation route for the balls 2 is completed in the nut member 3.

When the screw shaft 1 rotates, the balls 2 roll between the ball rolling grooves 10 of the screw shaft 1 and the load rolling grooves 42 of the nut main body 4 while applying load, and are then brought into a no-load state before entering the direction switching passages 56 provided in one return pieces 53. Then, the balls 2 are guided to the direction switching passages 56 of the other return pieces 53 by way of the ball return holes 60 of the pipe members 6, and are returned from the direction switching passages 56 to the ball rolling grooves 10 of the screw shaft 1 again. Since the cover plates 5, the second pieces 9, and the pipe members 6 are all formed of synthetic resin, of the endless circulation route for the balls 2, the direction switching passages 56 and the ball return holes 60, where the balls 2 roll under no load, are all covered with synthetic resin. Further, as described above, the spacers 20 of synthetic resin are provided between the balls 2 rolling one after another in the endless circulation route, so that there is no fear of the balls 2, which consist of steel balls, coming into contact with each other. Thus, the only metal members that come into contact with the balls 2 are the ball rolling grooves 10 of the screw shaft 1 and the load rolling grooves 42 of the nut main body 4, so that, in this ball screw device, it is possible to minimize the noise generation during the circulation of the balls 2 as far as possible.

Further, as shown in FIG. 1, in this ball screw device, when the scoop portion 55 dislodge the balls 2 from the screw shaft 1 at the entrance of the direction switching passage 56, the balls 2 are guided in a direction matched with the lead angle $\alpha$ of the ball rolling groove 10. Further, as shown in FIG. 2, the ball 2 are dislodged from the ball rolling groove 10 of the screw shaft 1 so as to move in the tangential direction of the screw shaft 1, and enter the direction switching passage 56. That is, the screw shaft 1 side entrance regions of the direction switching passages 56 are formed so as to be matched with the directions of tangential extensions of the ball rolling grooves 10 of the screw shaft 1, in other words, in conformity with the direction in which a cord spirally wound around the screw shaft 1 is unwound.

Figure 12:
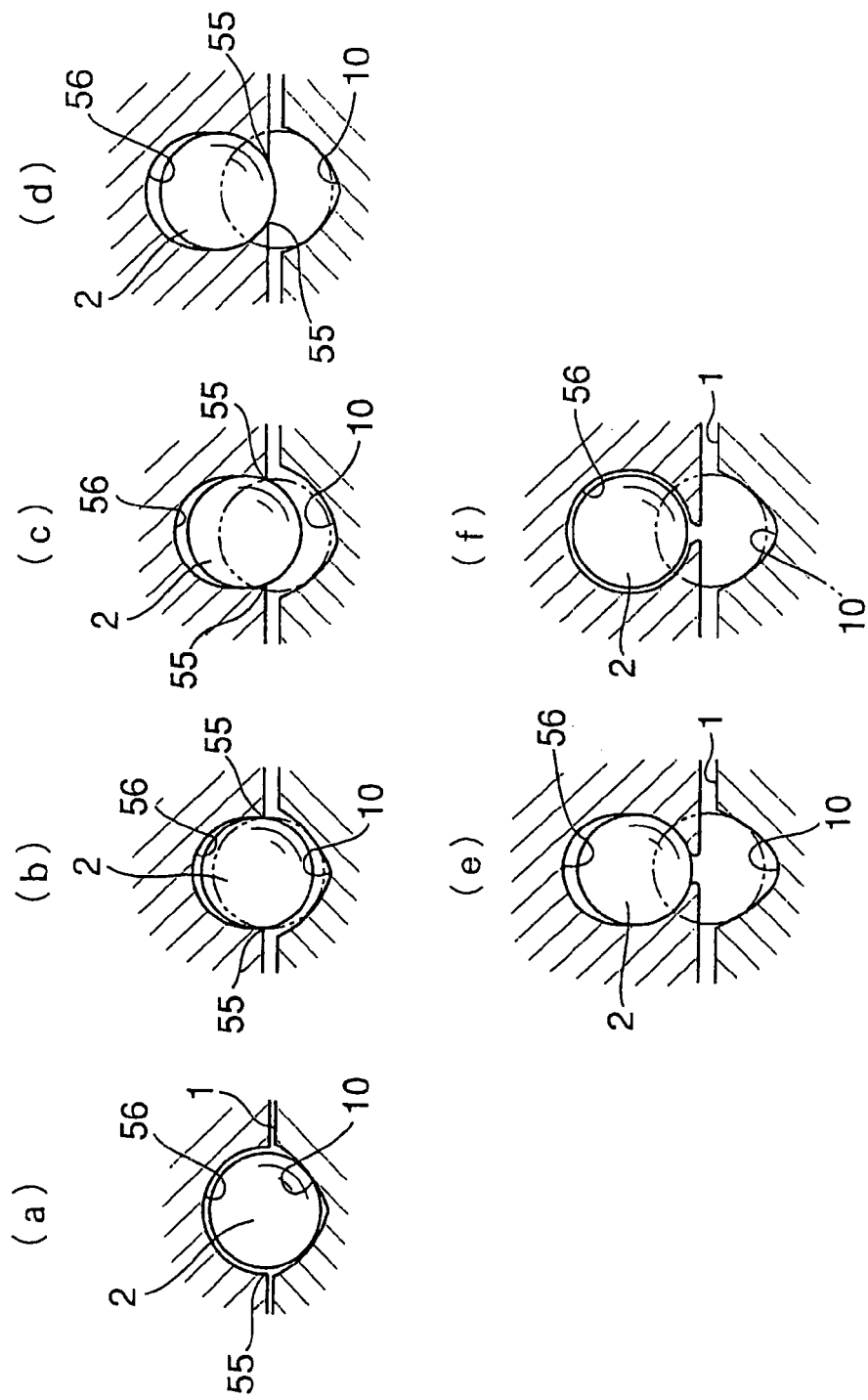
FIG. 12 is a view illustrating in sequence how a ball is dislodged from a ball rolling groove of a screw shaft.

FIGS. 12(*a*) through 12(*f*) illustrate how the scoop portion 55 formed in each return piece 53 detaches a ball 2 from the ball rolling groove 10 of the screw shaft 1. As shown in these drawings, the screw shaft 1 side entrance region of the direction switching passage 56 is formed so as to be opposed to the ball rolling groove 10, and the scoop portion 55 detaches the rolling ball 2 from the ball rolling groove 10 as the scoop portion 55 holds the ball gradually from either side, eventually accommodating the ball in the direction switching passage 56. Thus, the ball 2 being dislodged from the screw shaft 1 receives no external force that would forcibly change its rolling direction, and it is possible to smoothly dislodge the ball 2 from the ball rolling groove 10 and guide the balls 2 to the direction switching passage 56. Further, the direction switching passages 56 are gently curved and communicate with the ball returning holes 60, so that it is possible to dislodge the balls 2 smoothly from the ball rolling grooves 10 and guide them to the direction switching grooves 56. Further, the direction switching passages 56 are gently curved and communicate with the ball return holes 60, there is no fear of the balls 2 violently colliding with the inner walls of the direction switching passages 56, making it possible to smoothen the circulation of the balls 2 and to prevent noise generation as far as possible.

Then, in the ball screw device of this embodiment, the above-described direction switching passages 56 and the scoop portions 55 are provided in the return pieces 53 protruding from the cover plates 5, and the return pieces 53 are fit-engaged with the recesses 47 formed in the nut main body 4, so that the donut-shaped cover plates 5 themselves can be formed very thin, and it is possible to minimize the total axial length of the nut member 3. Further, even in the case in which the cover plates 5 are thus formed thin, it is possible to set the protruding amount of the return pieces 53, fit-engaged with the nut main body 4, with respect to the cover plates 5 large to some degree, so that it is possible to form direction switching passages 56 gently curved with respect to such return pieces 53, making it possible to smoothen the circulation of the balls 2 and to prevent as far as possible the generation of noise due to the circulation.

Figure 13:
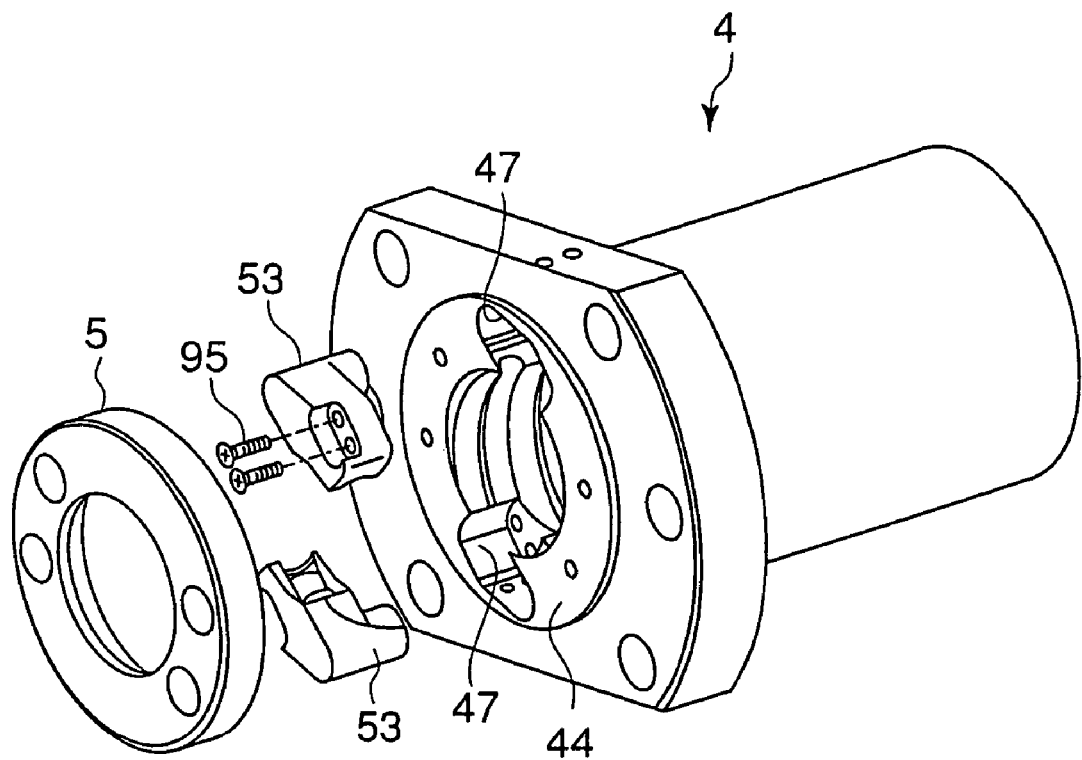
FIG. 13 is an exploded perspective view of a nut member of a ball screw device according to a second embodiment of the present invention.

FIG. 13 shows a ball screw device according to the second embodiment of the present invention.

While in the first embodiment described above the first pieces 54 forming the return pieces 53 are formed integrally with the cover plates 5, in the second embodiment, the first pieces 54 and the cover plates 5 are separated from each other, and the return pieces 53 are fit-engaged with the recesses 47 of the nut main body 4 without fixing the cover plates 5 to the nut main body 4. Otherwise, this embodiment is of the same construction as the first embodiment, so that the components that are the same as those of the first embodiment are indicated by the same reference numerals in FIG. 13, and a detailed description of such components will be omitted.

Figure 14:
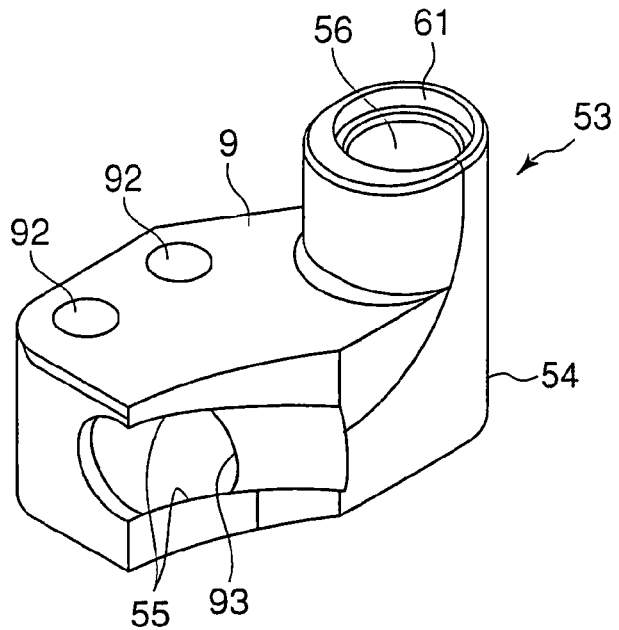
FIG. 14 is a perspective view of a return piece according to the second embodiment.
Figure 15:
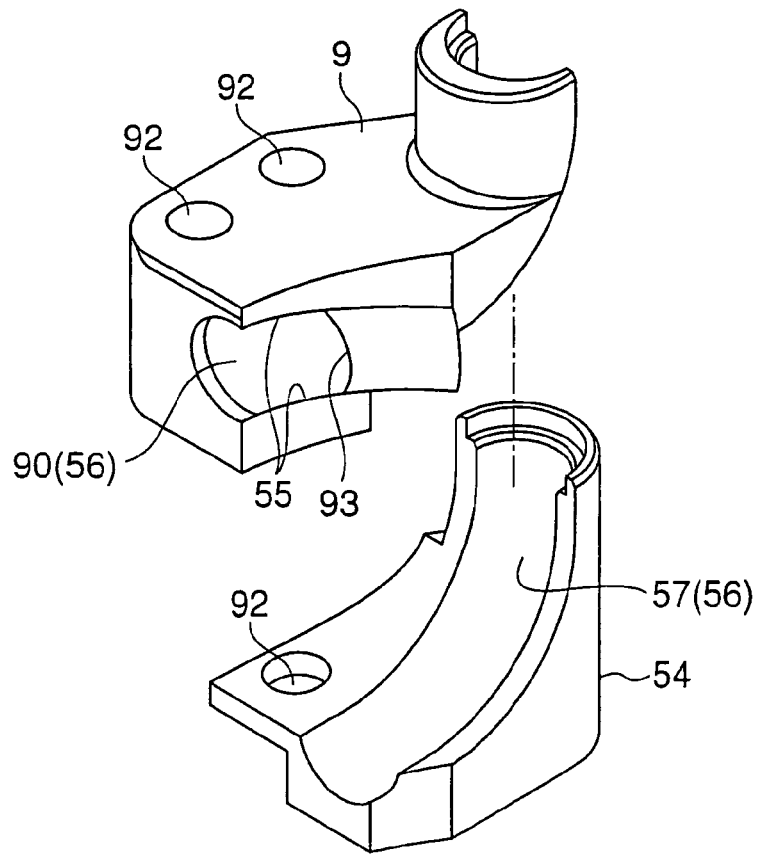
FIG. 15 is an exploded perspective view of the return piece of the second embodiment.
Figure 16:
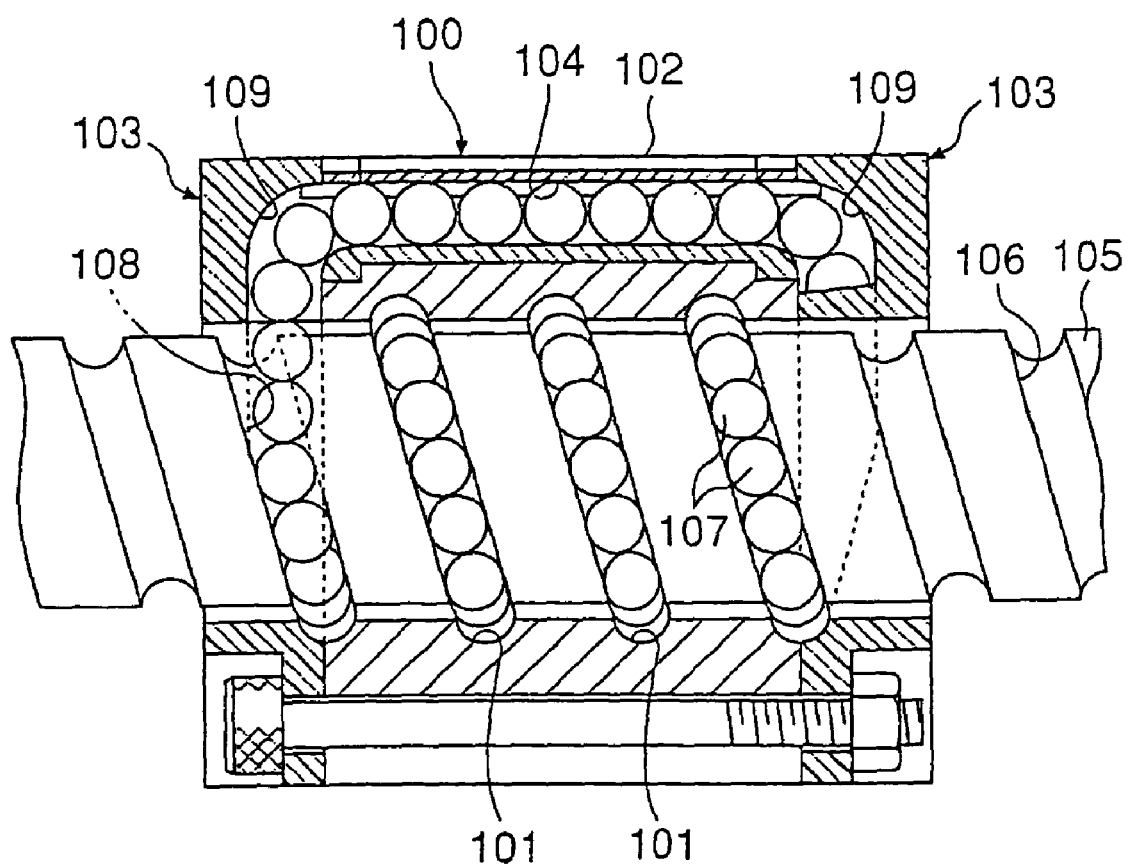
FIG. 16 is a sectional view of a ball screw device as disclosed in JP 06-201013 A.

FIG. 14 is a perspective view showing the return piece 53 adopted in the second embodiment. FIG. 15 is a perspective view showing the return piece 53 as divided into the first piece 54 and the second piece 9. While the first piece 54 and the second piece 9 may be formed by machining metal pieces, due to their complicated configuration, it is desirable to produce them by metal injection molding (MIM) of course, as in the first embodiment, it is also possible to produce them by injection molding of synthetic resin.

The return piece of the second embodiment is also divided into the first piece 54 and the second piece 9 by a curved plane including the center line of the direction switching passage 56. Unlike the first embodiment, this embodiment adopts a construction in which the screw shaft 1 side entrance of the direction switching passage 56 is formed in the second piece 9 without being divided. That is, the scoop portion 55 provided at the screw shaft 1 side entrance of the direction switching passage 56 is formed exclusively in the second piece 9. Thus, as compared with the return piece of the first embodiment, the return piece of this embodiment allows the scoop portion 55 to be formed with higher accuracy, which makes it possible to perform the operation of dislodging the balls 2 from the ball rolling groove 10 of the screw shaft 1 in a manner so much the more stable.

Further, the screw shaft 1 side entrance of the groove 90 formed in the second piece 9 is covered with a guide member 93 for guiding the spacers 20, provided between the balls 2, to the direction switching passage 56 together with the balls 2. When the first piece 54 and the second piece 9 are coupled with each other, the guide member is situated at the screw shaft 1 side entrance of the direction switching passage 56.

As described above, in the ball screw device of the present invention, the endless circulation route for the balls is formed solely by fit-engaging the return pieces with the recesses in the nut main body. Further, the return pieces are accommodated in the recesses of the nut main body and do not axially stick out of the nut main body, so that the cover plates themselves may simply consist of plate-like members, and even when the cover plates are mounted to the end surfaces of the nut main body to form the nut member, it is possible to minimize the total length of the nut member, thus making it possible to achieve a reduction in the size of the nut member. Further, regarding the return pieces fit-engaged with the nut main body, there are no limitations due to the reduction in size, and it is possible to freely form the direction switching passages, so that the balls dislodged from the ball rolling grooves of the screw shaft can be smoothly guided to the ball return holes, making it possible to minimize noise generation even when the balls are circulated at high speed. Thus, the ball screw of the present invention is optimum for the high-speed feeding of a movable body, such as a table.

In the first piece 54 and the second piece 9, there are formed through-holes 92 for fixing the return piece 53, obtained by coupling them together, to the nut main body 4. As shown in FIG. 13, by using screws 95 inserted into the through-holes 92, it is possible to secure the return pieces 53 in the recesses 47 of the nut main body 4. Thus, by fit-engaging the return pieces 53 with the recesses 47 of the nut main body 4, and by fixing them by means of the screws 95, it is possible to fix the return pieces 53 to the nut main body 4 accurately and firmly.

After the completion of the fixation of the return pieces 53 to the nut main body 4, the cover plates 5 are fixed to the plate mounting surfaces 44 of the nut main body 4 so as to cover the return pieces 53. These cover plates 5 are used for the purpose of fixing the labyrinth seals 7 to the nut main body 4 and sealing the gap between the nut main body 4 and the screw shaft 1. The cover plates 5 need not to be so strong as the return pieces 53, so that the cover plates 5 may as well be molded from synthetic resin even if the return pieces 53 are formed of metal.

Further, also in the ball screw device of the second embodiment, constructed as described above, the return pieces 53 are fit-engaged with the recesses 47 formed in the nut main body 4, so that there is no need to form the direction switching passages 56 in the cover plates 5, thus making it possible for the cover plates 5 themselves to be formed very thin. Further, in this ball screw device, two streaks of endless ball circulation routes are formed, and it is necessary to fit-engage two return pieces 53 to one end surface of the nut main body 4 and two return pieces 53 to the other end surface thereof, that is, four return pieces 53 in total. In the above-described first embodiment, two return pieces 53 are integrally formed with one cover plate 5. Thus, if the accuracy in the formation of the recesses 47 with respect to the nut main body 4 is rather low, the low positioning accuracy for the return pieces 53 with respect to one side of the nut main body 4 may result in a deterioration in the positioning accuracy for the return pieces 53 with respect to the other side. However, in the ball screw device of the second embodiment, the return pieces 53 are individually fit-engaged with the recesses 47 of the nut main body 4, so that the respective positioning accuracies for the return pieces 53 with respect to the nut main body 4 are independent of each other, and it is possible to fit-engage the return pieces 53 with the nut main body 4, depending solely on the accuracy in the formation of the recesses 47 in the nut main body 4. This helps to realize a still more smooth endless circulation of the balls.

INDUSTRIAL APPLICABILITY

As described above, in the ball screw device of the present invention, the endless circulation route for the balls is formed solely by fit-engaging the return pieces with the recesses in the nut main body. Further, the return pieces are accommodated in the recesses of the nut main body and do not axially stick out of the nut main body, so that the cover plates themselves may simply consist of plate-like members, and even when the cover plates are mounted to the end surfaces of the nut main body to form the nut member, it is possible to minimize the total length of the nut member, thus making it possible to achieve a reduction in the size of the nut member. Further, regarding the return pieces fit-engaged with the nut main body, there are no limitations due to the reduction in size, and it is possible to freely form the direction switching passages, so that the balls dislodged from the ball rolling grooves of the screw shaft can be smoothly guided to the ball return holes, making it possible to minimize noise generation even when the balls are circulated at high speed. Thus, the ball screw of the present invention is optimum for the high-speed feeding of a movable body, such as a table.

The invention claimed is:

1. A ball screw device, characterized by comprising:

a screw shaft having in its outer peripheral surface a spiral ball rolling groove;

a metal nut main body formed substantially as a cylinder with a through-hole through which the screw shaft is to be passed, the metal nut main body being threadedly engaged with the screw shaft through a number of balls, having in its inner peripheral surface a spiral load rolling groove facing the ball rolling groove of the screw shaft to form a load ball passage, and having in its inner peripheral surface a recess cut out in correspondence with both ends of the load rolling groove;

a synthetic resin pipe member mounted in the nut main body and forming a ball return hole substantially parallel to the screw shaft;

a return piece fit-engaged with the recess of the nut main body, the return piece being equipped with a scoop portion for dislodging the balls from the ball rolling groove of the screw shaft and a direction switching passage for guiding the dislodged balls to an entrance of the ball return hole, and cooperating with the pipe member to form an endless circulation route for the balls; and a cover plate formed substantially in a donut-like shape and fixed to each of both axial end surfaces of the nut main body to cover the return piece fit-engaged with the recess of the nut main body, wherein the screw shaft side entrance region of the direction switching passage is bored in conformity with a direction of an extension of the ball rolling groove of the screw shaft in a tangential direction of the screw shaft, wherein the return piece is equipped with a cylindrical sleeve engaged with the end of the pipe member, wherein the direction switching passage is curved from the scoop portion to the forward end of the cylindrical sleeve and characterized in that the scoop portion protrudes toward the screw shaft slightly beyond the inner peripheral surface of the nut main body, and that the direction switching passage is formed by cutting out the direction switching passage in an arcuate configuration in conformity with the inner peripheral surface of the nut main body.

2. A ball screw device according to claim 1, characterized in that the return piece is divided into a first piece and a second piece by a curved plane including a center line of the direction switching passage.

3. A ball screw device according to claim 2, characterized in that the scoop portion is divided into a first piece and a second piece, and that the scoop portion is completed at a screw shaft side entrance of the direction switching passage by coupling the first piece and the second piece with each other.

4. A ball screw device according to claim 2, characterized in that the scoop portion is formed in one of the first piece and the second piece.

5. A ball screw device according to one of claims 2 and 4, characterized in that the first piece is formed integrally with the cover plate, whereas the second piece is fixed to the first piece.

6. A ball screw device according to claim 1, characterized in that an annular groove to be fit-engaged with an end portion of the pipe member is formed at a ball return hole side edge portion of the direction switching passage, and that, when the return piece is fit-engaged with the recess of the nut main body, the pipe member is secured in position to the nut main body.

* * * * *